(12) United States Patent
Reid

(10) Patent No.: US 6,634,832 B2
(45) Date of Patent: Oct. 21, 2003

(54) APPARATUS FOR TRANSPORTING PARTICULATE MATERIALS FROM A LOWER LEVEL TO A HIGHER LEVEL

(76) Inventor: Neil George Reid, 3 Plumpton Court, Leapings Lane, Manchester Road, Thurlstone, Sheffield (GB), S36 9QW ( * ) Notice: Subject to any disclaimer, the term of this patent is extended or adjusted under 35 U.S.C. 154(b) by 0 days.

(21) Appl. No.: 10/170,907

(22) Filed: Jun. 13, 2002

(65) Prior Publication Data

US 2002/0154955 A1 Oct. 24, 2002

Related U.S. Application Data

(62) Division of application No. 09/481,960, filed on Jan. 12, 2000.

(51) Int. Cl.$^7$ .............................................. B65G 53/66
(52) U.S. Cl. ......................... 406/50; 406/106; 406/168; 406/131
(58) Field of Search ......................... 406/50, 106, 131, 406/173, 183, 197, 168, 171

(56) References Cited

U.S. PATENT DOCUMENTS

| | | | | | |
|---|---|---|---|---|---|
| 2,827,185 | A | * | 3/1958 | Feigin ..................... | 214/83.28 |
| 3,617,095 | A | * | 11/1971 | Lissant ........................ | 302/66 |
| 4,282,006 | A | * | 8/1981 | Funk ............................. | 44/51 |
| 4,878,549 | A | | 11/1989 | Bennet ........................ | 175/248 |
| 4,950,034 | A | | 8/1990 | Reid .......................... | 299/15 |
| 5,069,583 | A | | 12/1991 | Caldwell ................... | 406/182 |

FOREIGN PATENT DOCUMENTS

| | | | |
|---|---|---|---|
| EP | 0019498 A1 | 11/1980 | ....................... 33/6 |
| GB | 2047818 A | 12/1980 | ..................... 53/30 |
| GB | 1543817 | 4/1997 | ..................... 53/30 |

* cited by examiner

*Primary Examiner*—Joseph A. Dillon
(74) *Attorney, Agent, or Firm*—Watov & Kipnes, P.C.; Kenneth Watov

(57) ABSTRACT

A method of and apparatus for transporting particulate materials from a lower level to a higher level are disclosed, the method comprising:

establishing a flow loop comprising a closeable chamber for receiving batches of the particulate materials, a first flow conduit extending upwardly from the chamber to a delivery level, a second flow conduit extending upwardly from the chamber to a header tank located at a higher level than said delivery level, and valve means at the chamber for selectively isolating the chamber from the first and second flow conduits;

filling the flow loop with a pseudoplastic flotation fluid;

operating the valve means to isolate the chamber from the first and second flow conduits;

introducing a charge of the particulate materials into the chamber and then closing the chamber;

operating the valve means to connect the first and second flow conduits to the chamber; and maintaining a supply of fluid in the header tank such that fluid and entrained particulate materials flow from the chamber through the first flow conduit to the delivery level.

11 Claims, 6 Drawing Sheets

APPARATUS FOR TRANSPORTING PARTICULATE MATERIALS FROM A LOWER LEVEL TO A HIGHER LEVEL

This Divisional Application claims the benefit to co-pending, nonprovisional U.S. patent application Ser. No. 09/481,960, entitled "METHOD FOR TRANSPORTING PARTICULATE MATERIALS FROM A LOWER LEVEL TO A HIGHER LEVEL", filed on Jan. 12, 2000

FIELD OF THE INVENTION

This invention relates to a method of and apparatus for transporting particulate materials from a lower level to a higher level, for example gold and other mined ores or construction debris.

BACKGROUND TO THE INVENTION

It is known to use pseudoplastic flotation fluids in the pumping of materials of suitable particle size, for example drilling debris in an oil well. While this technique might in theory be used to transport ores and other solids from the working level of a mine to the surface, rather than using conventional mechanical lifting gear, in practice the energy requirements are too great to make the technique a practical proposition.

In general the currently-utilised method of moving gold and other mined ores or construction debris to surface is by means of single or multi-stacked ore skips as hoisted by wire rope with surface located winding gear powered by whatever required motive force via purpose designed control equipment. This method has in passing to carry the non productive weight of the skips and their stacking frame plus the weight of the hoisting wire rope, with allowances for the overcoming of inertia and associated friction forces. A multi-skip hoist shaft can also require extra area over that for man-riding cages and equipment hoists as might be obviated if ore could be pumped to surface. Whilst it is known that ore at suitably ground down size can be pumped in a fluid of higher density than water so as to be able to hold the particulate in suspension, this imparts hydrostatic and surge forces on such pumps which increase with depth. Where a sudden stoppage in flow occurs, this can create at restart many time-consuming problems in such systems.

All metal mines and some civil construction works utilise water at their mining or rock excavation level, whether for the drilling of diamond cored mineral or rock samples or for general cooling and dust control from percussion drilling and blasting. The liquid residue of such methods can be utilised for the mixing of hydraulic ore hoist fluid as afterwards recycled within the working zone prior to any excess being pumped back to circuit or to surface from a gravity fed sump located at base of access shaft.

Background prior art is indicated by GB-A-2 047 818, GB-A-1 543 817, EP-A-0194 498 and US-A-5 069 583.

SUMMARY OF THE INVENTION

The invention provides a method of transporting particulate materials from a lower level to a higher level, comprising:

establishing a flow loop comprising a closeable chamber for receiving batches of the particulate materials, a first flow conduit extending upwardly from the chamber to a delivery level, a second flow conduit extending upwardly from the chamber to a header tank located at a higher level than said delivery level, and valve means at the chamber for selectively isolating the chamber from the first and second flow conduits;

filling the flow loop with a pseudoplastic flotation fluid;

operating the valve means to isolate the chamber from the first and second flow conduits;

introducing a charge of the particulate materials into the chamber and then closing the chamber;

operating the valve means to connect the first and second flow conduits to the chamber; and maintaining a supply of fluid in the header tank such that fluid and entrained particulate materials flow from the chamber through the first flow conduit to the delivery level.

The invention also provides apparatus for transporting particulate materials from a lower level to a higher level, comprising:

a flow loop comprising a closeable chamber for receiving batches of the particulate materials, a first flow conduit extending upwardly from the chamber to a delivery level, a second flow conduit extending upwardly from the chamber to a header tank located at a higher level than said delivery level, and valve means at the chamber for selectively isolating the chamber from the first and second flow conduits;

a pseudoplastic flotation fluid filling the flow loop;

means for introducing a charge of the particulate materials into the chamber and means for closing the chamber; and means for separating the particulate material from the fluid discharged at the delivery level and for returning the fluid to the header tank.

Thus, the invention provides for the transport of ores, minerals and the like in a stream of purpose designed flotation fluid by means of an upper and lower interconnected U tube with an ore loading chamber just below the base of the upper U tube, this and the lower U tube being controlled by a multi-function valve whose hydraulic jack components are able to utilise the same flotation chemical, preferably at a higher concentration, which can simultaneously lubricate all other moving parts of the valve apparatus for use in that method.

The ore loading chamber can be formed in situ as a rock pressure vessels. Also, the two limbs of the upper U tube can be formed as drilled holes at the edge of or beyond the edge of any mine or tunnel access shaft, preferably in a manner which allows the drilling bit to be removed from within its drilling drive tube to allow an onward sealed in situ use as the pressurisation and hoisting ducts to such an ore loading chamber. Such methods of formation are known from U.S. Pat. Nos. 4,950.034 and 4,878,549.

In considering the utilisation of a hydraulic method of ore or tunnel debris hoisting or horizontal transportation the further reuse of whatever water is existent at the salient location the primary objective where the continuous pumping of minerals of higher specific gravity than water poses not only the problem of their suspension during the pumping process but also their chemical compatibility with the purpose designed flotation fluid as mixed with water having whatever pH and minerals content. By the use of a double U tube to continuously eject ore in a stream of suspending biodegradable pseudoplastic fluid having a design able to accommodate wide ranges of pH and minerals content offers additional advantages:

the reuse of liquid run off from other in-mine systems;

the partial use as an ore lixiviant during its transportation phase;

can be utilised as the hydraulic fluid element of recycled treated ore as stowed mine fill with or without uncontaminated cementitious addition; and also able to be diluted to water viscosity for general mine use.

Preferably according to the present invention there is provided a method of operating a chain linked high pressure valve apparatus at the intersection of an upper and lower U tube, comprising an outer multi-valve common housing with at least nine entrants one of which is fitted with a double cone type valve allowing the sequence tensioned movement of a chain of a type exhibiting zero elongation via a third unvalved internal entrant carrying a sliding section of the apparatus having three separated aperture alignment type valves as allow the double U tube system to eject either the ore in suspension or recycle the suspension devoid of ore where this element of cycle allows any desanding or chemical beneficiation. Also, at higher mine level or at ground level of a set of synchronised lower pressure standard valves is preferably provided, connecting into the top of the longer U tube limb to allow this to impart a larger hydrostatic head to that in shorter U tube limb, both limbs connecting to the flotation fluid pumping or gravity supply pipework such as to allow a cyclic operation via a closed pre-set pressure control loop. Alternatively, an open gravity-controlled overspill calibrated excess hydraulic head arrangement incorporates an open or closed fluid volume control funnel at top of longer U tube limb, where in the gravity-assisted case a reciprocal raising and lowering of a weighted vessel by use of a wire rope can effect control of volumetric symmetry between the longer and shorter U tube limbs as retains their pre-calculated differential head. Additionally, a secondary utilisation this wire rope can be used to open the gravity weight assisted cone valve in the lower level commonly-housed control apparatus, this being otherwise moved by either a single or double high pressure hydraulic jack, utilising the same biodegradable pseudoplastic flotation chemical at an increased concentration as hydraulic fluid by which to effect a reciprocal movement with or without assistant gravity ballast weights of the sliding ram type multi-apertured valve which forms a preferred feature of the apparatus of the invention.

Preferably, at lower mine level the valve apparatus within its common housing has a short enlarged vertical section separating an upper and lower coned valve seat where a solid centralised rod below this enlarged section allows movement of gravity weighted two way coned valve end carrier. Any non-seated position produces circulation of flow into the lower pressuriseable ore-loading chamber, which can be sealed off for such purpose by means of a tensioned link chain connected to a single or reciprocating hydraulic ram in a manner that produces closure by either of the higher or lower engaged cone type valves. In this way flow continuation of fluid or ore fluid mixture is allowed upwards from the base of the lower U tube during the filling of loading chamber at atmospheric pressure. The selected cyclic flow status is achieved by the gravity weighted link chain assisting positioning of a sliding piston element within the common housing via intermediate action of a rocking sprocketed unit of small enough radius to move in an arc between fixed stops set into the common housing, thereby providing by piston sliding action the alignment of any one of three apertures in this element of apparatus as disposed at whatever angle to achieve safe cyclic non surge flow.

At apparatus level preferably a separately-attached high pressure hydraulic jack or jacks are set into the common housing at such angled position as to obtain a thrust reaction from the adjacent rock face by which to effect sequential positioning of the sliding piston within the valve apparatus common housing. The middle aperture of the housing preferably has a through bore allowing passage of the ore from the lower U tube upward into the shorter U tube limb above the control apparatus en route to its discharge elevation, the adjacent aperture in the direction of the longer U tube limb being able to promote flow through the upper U tube when devoid of ore by which to provide surgeless continuity of ore hoisting during closed-off reloading of ore from gravity discharging mine level dry ore chute at atmospheric pressure. This action is effected simultaneously with activation of the adjacent double cone valve together with positioning of furthest of the three apertures from longer U tube limb to give a connection from the lower U tube by gravity flow into the sump below the base of lower U tube bend, where the sump volume is larger than that of the entire fluid circuit to allow its use for evacuation of all fluid with or without ore from the system for either safety or maintenance reasons. The sump may also be gravity fed during ore loading, from an overflow valve set into the common housing below the enlarged section housing the double cone valve and the top of the loading chamber which has a separately sealed valve for ingress of ore. This is also able to be sealed by means of a jacked down valve using rock as its reactant force where these and any additional radial jacks that are used to stabilise the loading chamber about its centroid to have jack seatings as allow removal of the jacks for periodic maintenance.

Separate safety and operational functions of the double U tube system may include complete fluid evacuation of the system effected by a combined vacuum and pressure subsidiary pumping loop located at the level of the multivalve control apparatus and which negates the need for any valve protrusions within the U bend. The construction of the apparatus within a thick wall casting is able to accommodate oversizing due to metal loss from ore scour. A venturi-induced siphon can be effected by the separately operating sump pump which recycles all overflow fluid from the ore-loading phase of the cycle at a steady pumping rate back into the longer U tube limb above the control apparatus in such a way as to provide a replenishment of U tube systems motivating head imbalance. Separately valved sub circuits at ore discharge elevation can produce laminar or venturi induced vacuum related flow for the optimised use of necessary hydrocyclones able to remove fine ore particles prior to addition or beneficiation of flotation chemical or even to provide a final jetting action to any blockage at ore discharge point.

By way of an additional hydraulic circuitry control, the end cap incorporating the maintenance entry to the apparatus may also incorporate the control pipework and inbuilt pre-sealed entrant to expandable ring seals system by which to ensure against any small ore particles from the transportation stream being able to clog the sliding valve mechanism. By the continuously imposed head of the longer U tube limb, self-cleaning is effected. The end cap may also incorporate valves able to record and dissipate any induced negative or positive air or fluid pressures present in the cyclic system, these further negating the incidence of any surge condition where any flow cessation would manifest a smoothly changing rheological status.

Assistant elements may be included to assist the functioning of the sliding valve element of the control valve. For example, this can also utilise one or more bearing surfaces either as rails or grooves by which to guide and centralise the sliding portion of the valve, such bearing surfaces having gaps at the ring seal positions in the form of radial grooves able to accommodate the deflated ring packers during movement of the sliding element to any aperture position. A secondary set of ring seals can be set into a solid ring ledge forming part of the common housing these of either inflatable or compressive expansion type, the latter form taking advantage of the available jacking force. The jacks themselves would be motivated by hydraulic hoisting fluid rather than oil, since this might upset cyclic balance of pH and viscosity factors. The jack housings may be fitted with purpose-designed replenishable jacking consistency pseudoplastic fluid reservoirs at required overpressure to the salient hydrostatic head in the ore hoisting system where all periodic mechanical maintenance would be accomplished via an apparatus end cap.

As the motivating force element of the total cyclic system, the imbalance between the longer and shorter U tubes provides a hydraulic jacking effect by which the ore placed in the loading chamber is forced into U tube bend at its lowest level by the superimposed hydrostatic head from the upper U tube. This is then shut off from lower U tube after each batch of ore has passed through the systems multi-valve control apparatus for its upward transportation to surface treatment plant, where after each such cyclic action the loading chamber holds an element of the flotation fluid equal to the displaced volume of exuded ore, a similar amount of fresh ore then being placed dry by tremie tube into the loading chamber. During loading of the chamber, the ore displaces its own volume of fluid via a separate valve to a lower holding sump, where a pump at the lowest level of the cyclic system then transfers the excess flotation chemical up to the holding reservoir at the head of the longer U tube limb which has a sufficient cubic capacity and height above the discharge end of the shorter U tube limb to promote a gravity flow under the action of the imbalance between the two limbs. The whole cyclic system is thus powered by only the sump pump, which can be of sufficient size to drive any upper fluid circulation elements relating to the mixing and beneficiated recycling of salient flotation chemical dosages.

BRIEF DESCRIPTION OF THE DRAWINGS

An embodiment of the present invention will be described by way of an example with reference to the following drawings, in which.

DETAILED DESCRIPTION OF THE ILLUSTRATED EMBODIMENTS

Figure 1:
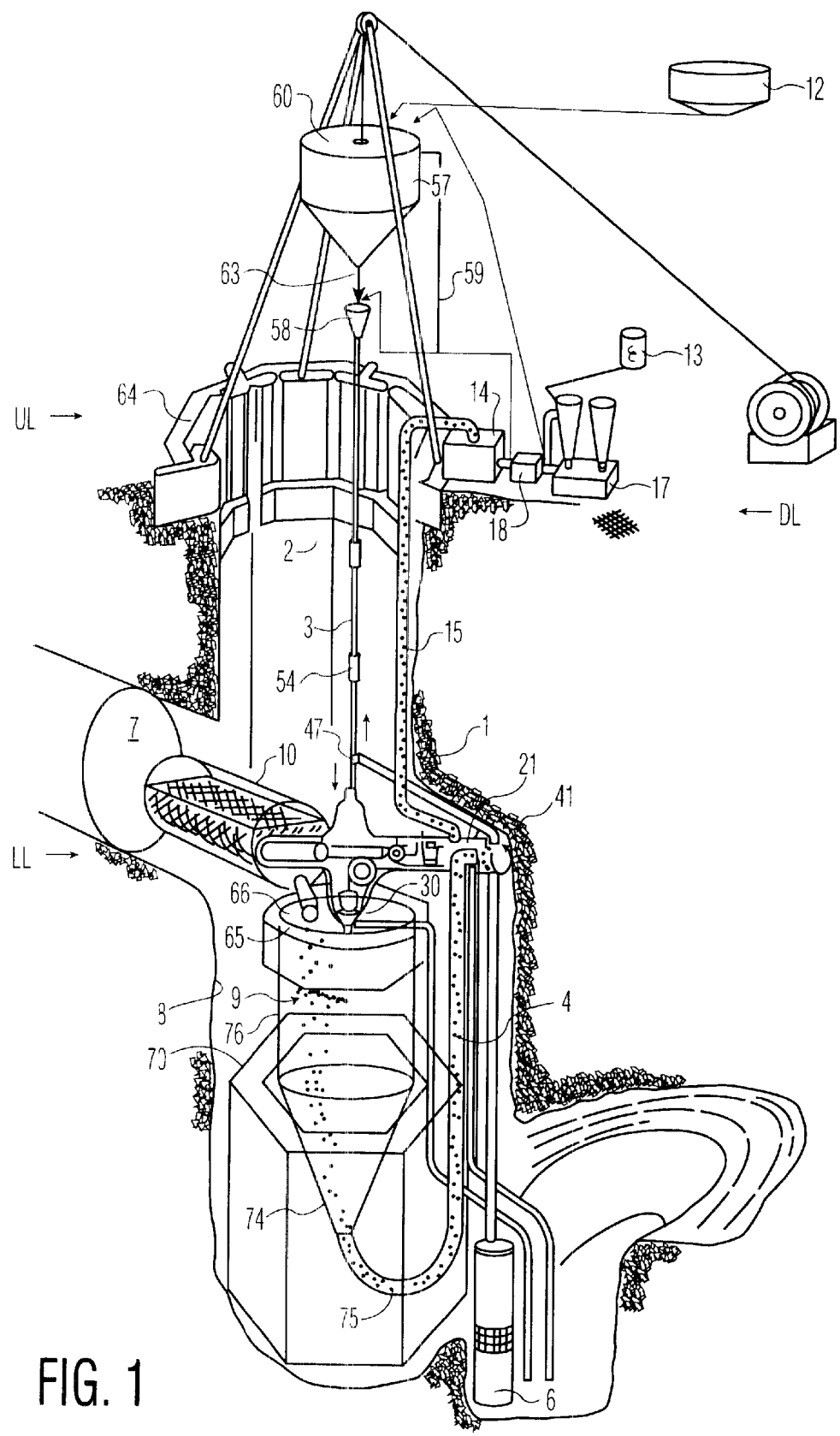
FIG. 1 is a perspective of the entire hydraulic ore hoist system sited within and adjacent to a shaft and mine roadway which shows the location of the apparatus according to the invention.

Referring to FIG. 1, an embodiment of invention is positioned in a typical mine shaft (1) with the angles to its sides accommodating pre drilled holes (2) acting as the ducts within which to house the unequal limbs of a U tube (4) and (3) constituting respectively a first flow conduit and a second flow conduit. The base (5) of the U tube is above the level of an escape gravity fed sump with connected sump pump (6). Mine roadways at various lower levels, indicated generally at LL, radiate to distant ore producing zones (7), the shaft and roadway intersection zone having a shaped excavation (8) able to house the lower inter connected ore loading chamber (9) and its feeding hopper (10). These operate in a sequential manner in tandem with a control device (11).

In the following description, attention is directed to various arrows alongside or within (b fluid pipes, conduits and valves depicted in the drawings to indicate the normal fluid flow directions.

Figure 2:
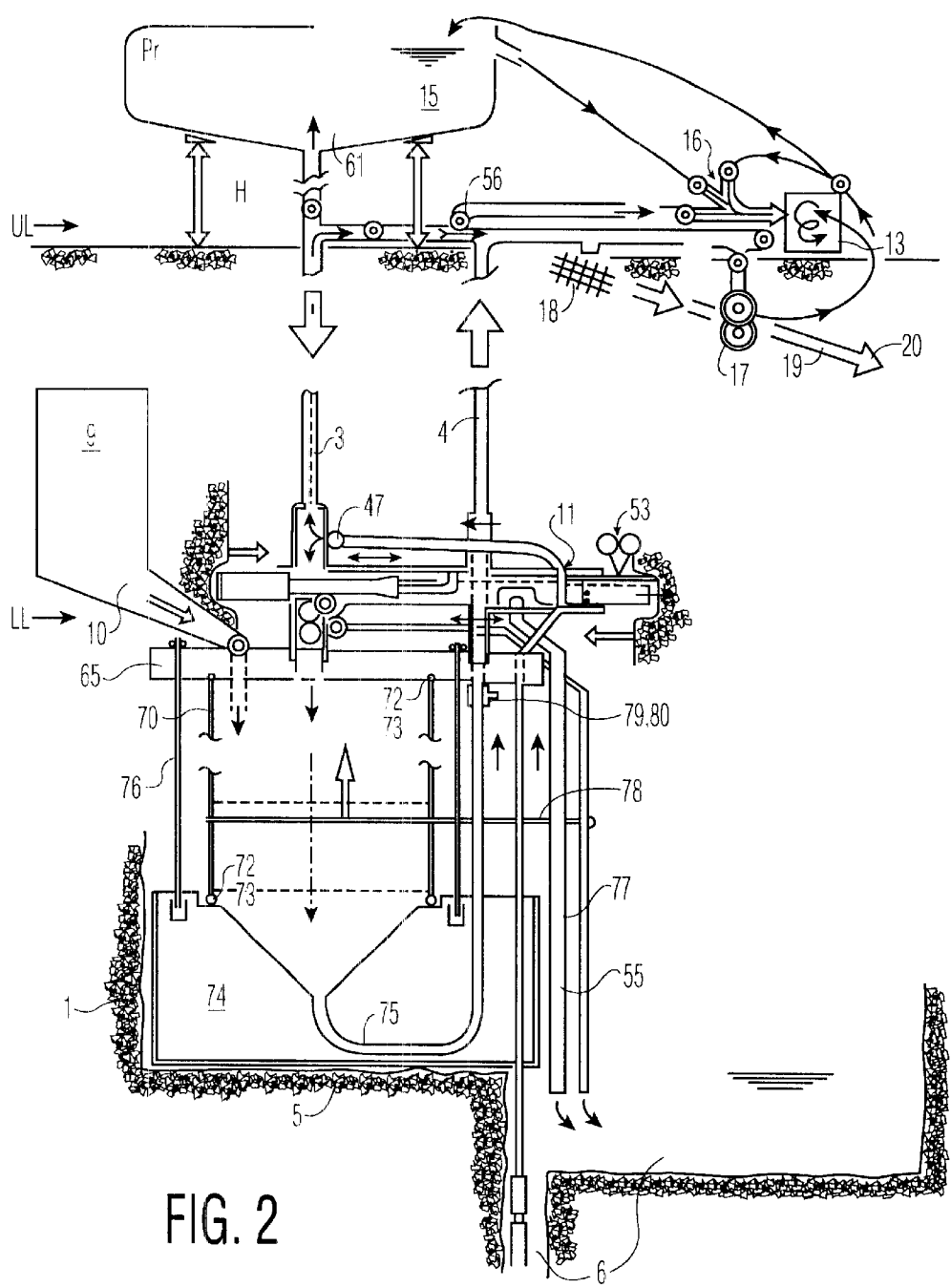
FIG. 2 is a sectional view of the total fluid circuitry.
Figure 3:
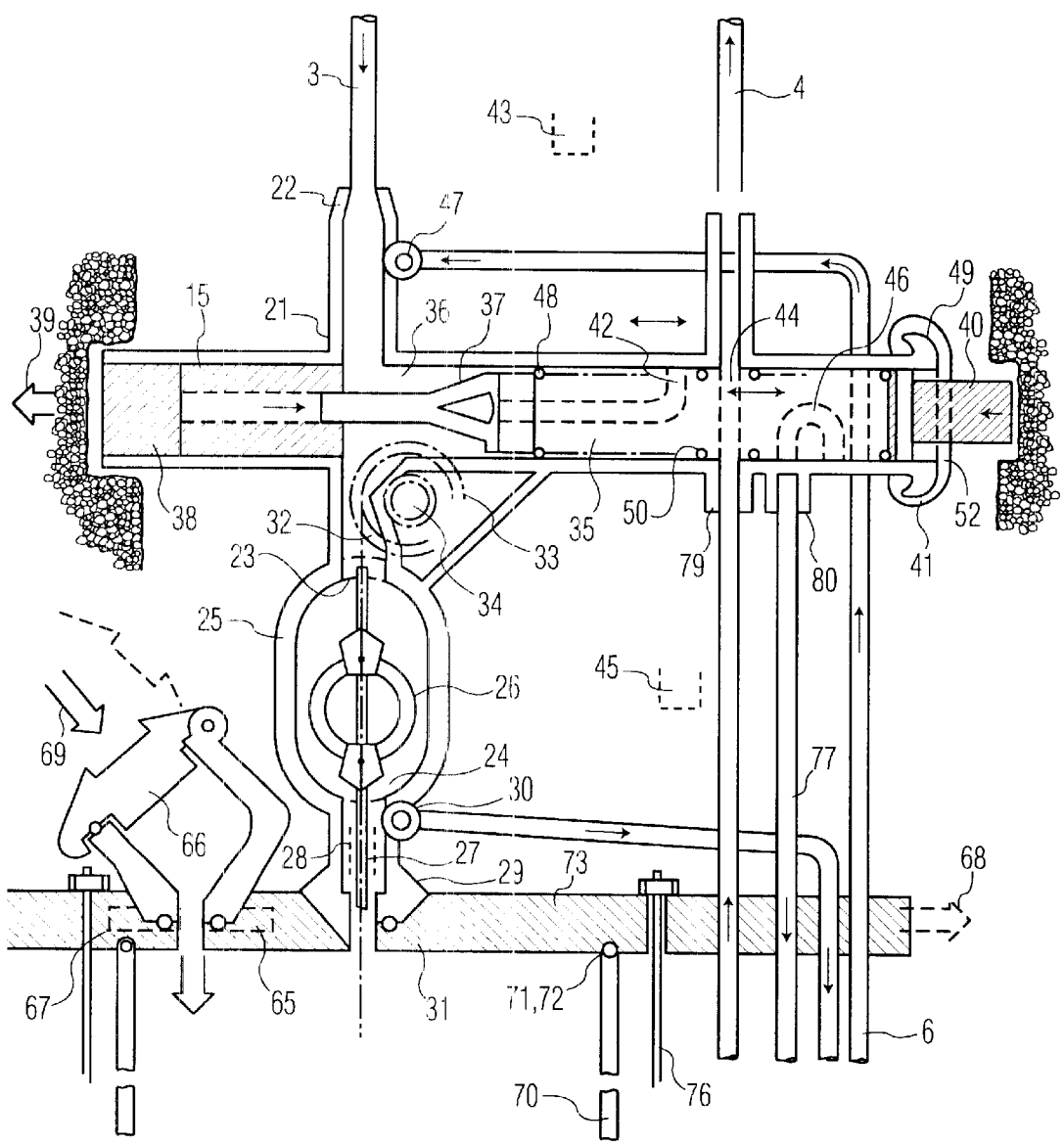
FIG. 3 is a detailed sectional view of the control apparatus.
Figure 4:
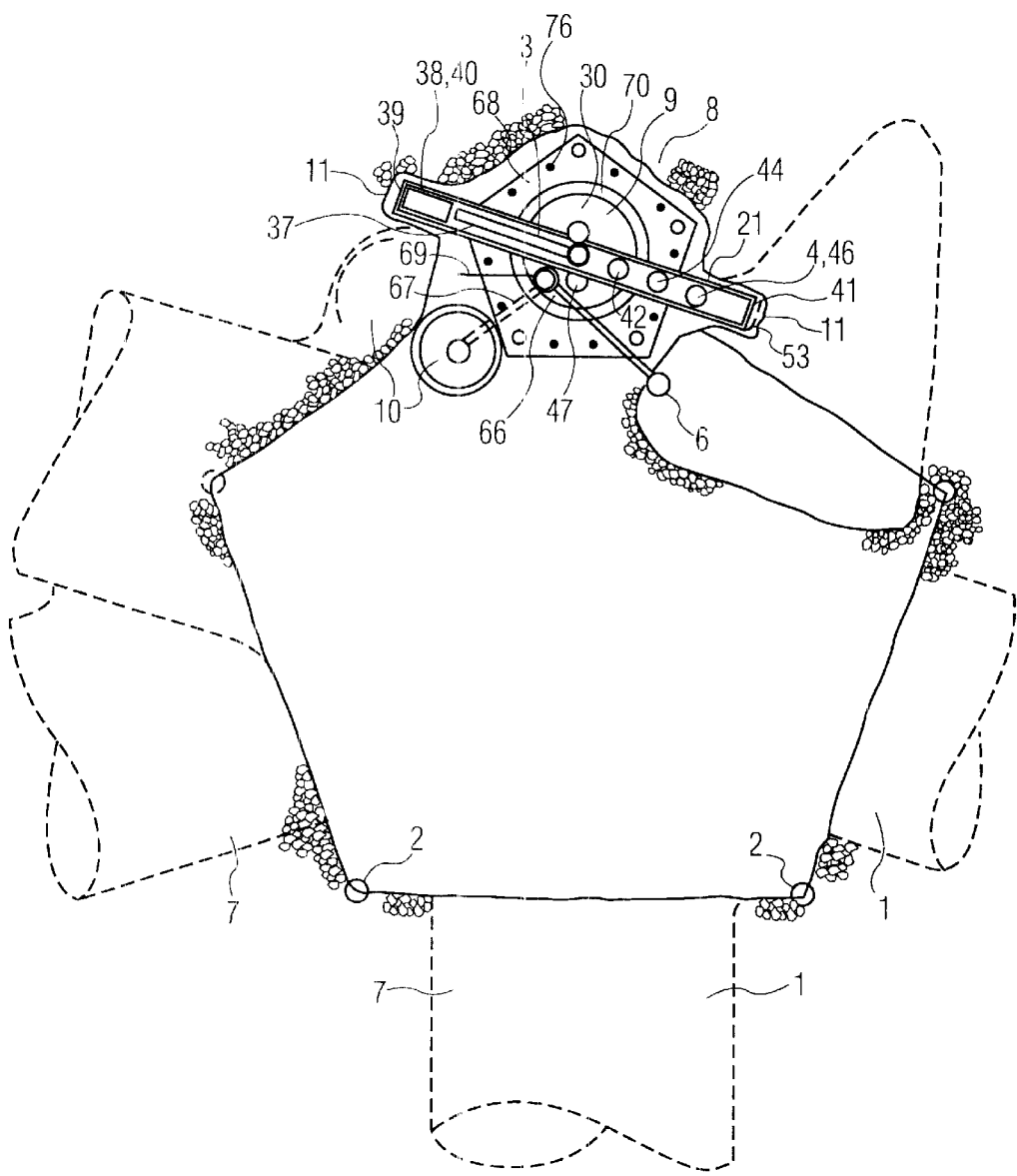
FIG. 4 is a downward plan view of the lower U tube element.
Figure 5:
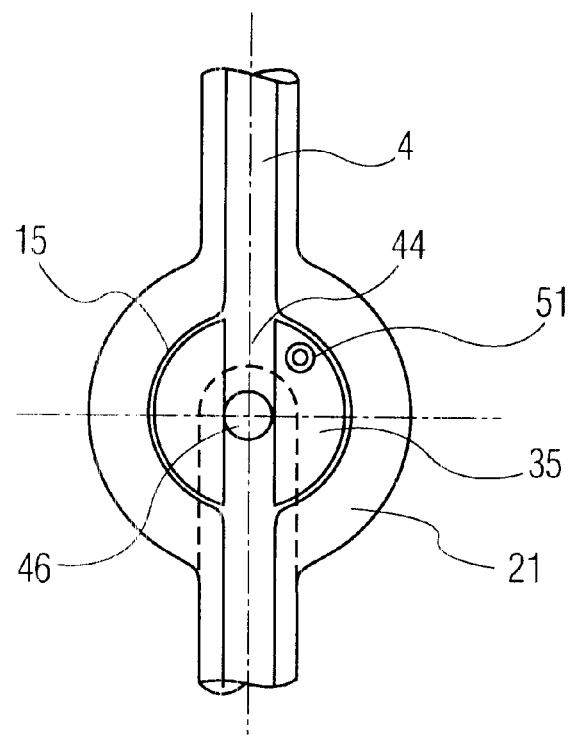
FIG. 5 is a cross sectional view of the sliding valve element.
Figure 6:
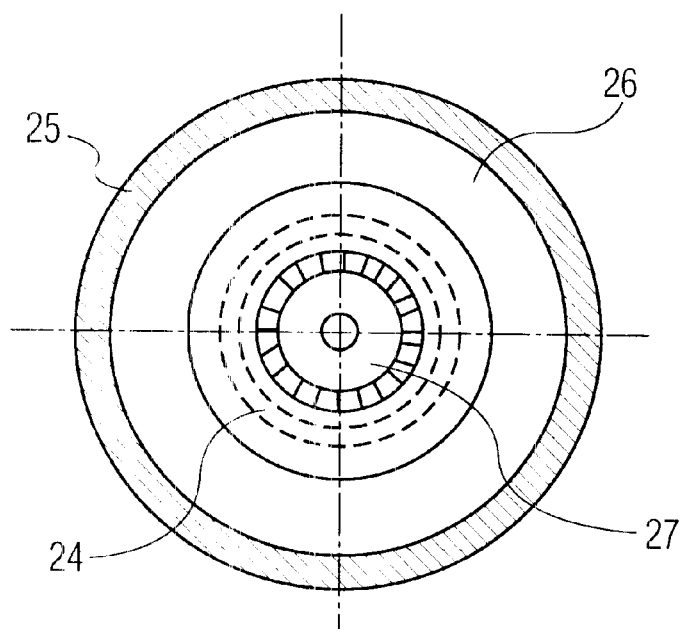
FIG. 6 is a cross sectional view of double cone valve element.

The circuitry of system is shown more particularly in FIG. 2, where at an upper level indicated generally at UL, at or above ground level, the cyclic fluid control above the device includes a gravity or pressurized water supply (12) feeding to a mixer (13), as shown in FIG. 2, and pump (14), as shown in FIG. 3, able to provide the circuit with a pseudoplastic flotation chemical (15), which can be recycled via a ground level low pressure valve array (16), by which any necessary chemical upgrading can be accomplished after removal of trapped fines by (17). The hoisted ore is separated after each cyclic operation by a gravity vibrating screen (18) allowing transit at delivery level (indicated generally at DL) of non or part lixiviated ore (19) to the main ore treatment plant (20). The flotation chemical then recycled by said pump passes down the longer of the two U tube limbs (3) to the lower level of the U tube hydraulic ore hoist system and its main multi-valve control device (11) constituting valve means, which will now be more particularly described with reference to FIGS. 3 to 6.

Figure 7:
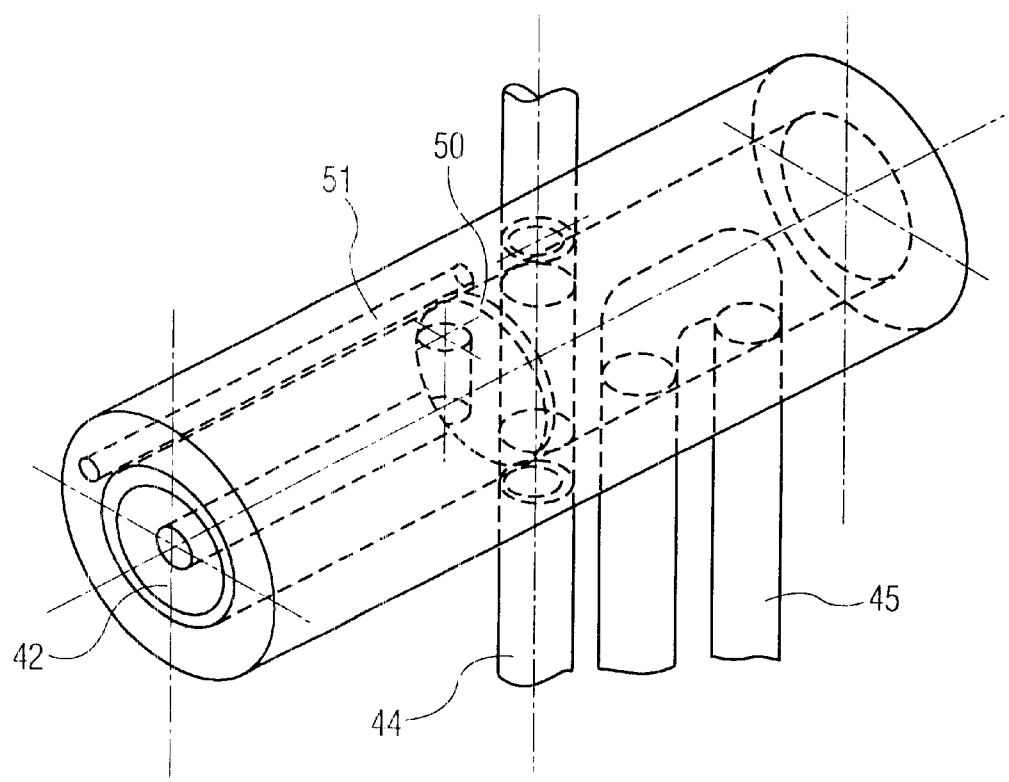
FIG. 7 is a detail of sliding valves expanding seals.

The general lower level circuitry which passes into control device (11) consists of the U tubes upper limb (3) providing the motive hydraulic head, passing through a thick wall common housing (21) of the said control device, which has an upper entrant (22) vertically above two cone valve seats (23) and (24). These are set into an enlarged volumetric section (25) able to effect non-surge flow during operational modes not having either cone valve in shut position. Moving coned ends are set into a gravity weighted element (26) which has a protruding rod (27) able to move in a centralising guide (28) in the connection section (29), which has a pressure relieving overflow valve (30) below the cone valve seat (24) and above the connection (31) to the ore loading chamber (9). An upwardly protruding rod connects via a chain (32) to a sprocketed arcing element (33) with its bearing (34) set into the common housing (21) such as to allow a radial movement of said chain to assist the sliding motion of piston (35). The piston 35 is set into an internal housing entrant (36), and is acted on by a ram (37) from a hydraulic jack (38) able to take its reactive force from adjacent rock at whatever salient angled position (39) either alone or together with a reciprocal jack (40) sited at furthest end (41) of common housing (21). The said jacks with assistance of gravity weighted element (26) allow the positioning of any one of three vertical apertures (42), in turn allowing an upper U tube configuration (43) by connection of ducts (3) and (4) or (44) to allow transportation through lower U tube configuration (45) upward to the gravity discharge point (20) or (46) as allows the gravity overflow of flotation fluid from the said lower U tube. This function of the multi-aperture piston valve (11) also allows the draining of the shorter limb of the upper U tube to the lowest located pump (6) sump to replenish the cyclic fluid above the sliding valve element and below the upper entrant to the common housing (21) via a non return valve (47). Additional elements of the apparatus are more particularly described in FIG. 7.

The sliding element of the control apparatus (11) which moves between two extremities within the common housing (21) has deformable type ring seals and bearing ledges (48) and (49) within the said housing to act both as fluid seals arid anti jar units. The more specific sealing of each required aperture to the sliding piston is effected by high pressure sealing rings of the expanding type (50) set equidistant about each aperture and expanded via a high pressure circuit (51) set into the body of the sliding piston element operated from furthest end of housing (41). This is dually used as an installation and maintenance port via a pressure cap (52), which houses a combined pressure and flow control gauge (53). The hydraulic jack at this position is able to operate through the said cap in unison with the jack (38) where both are able to use a higher concentration of flotation fluid (15) both as lubricant and motivation force.

Whilst the control device operates at the junction of an upper and lower U tube configuration, other elements of the total system less salient to its flotation cycle are now described. The down and up fluid ducts (3) and (4) can be jointed in long lengths by means of self-sealing splined couplings (54), which can be generally used for all radiused joints within the system, particularly at those elevations that can be jacked apart to allow insertion of such couplings. The sump pump (6) connects into the non return valve (47) by which to effect the transfer of recycled fluid into the higher U tube limb (3), and can be optionally routed to effect any siphon effect (55) by which to totally evacuate ore and fluid from the valveless lower U bend, or to provide a jetting ram arrangement (56) to give any required increase in flow velocity to assist the discharge of ore at its delivery point to treatment plant (20) or to optimise flow at the hydrocyclone (17) positions within the upper circuitry.

As a separate hydraulic control at the upper level, the open gravity filled flotation fluid reservoir (57) can have a funnel type entrant (58) and overflow (59) or an optional pressuriseable capping 60 (FIG. 1) for locations not having an escarpment able to accommodate said reservoir at a high enough level to provide a gravity fed hydraulic head imbalance. A separately operated rope hoist and gantry (62) would be able to position any open or closed coned cylinder or sphere type fluid reservoir at such elevation able to manifest the said head imbalance. Such reservoir could be connected to the downward flowing U tube limb by a flexible conduit (63), any superimposed loading adjacent to mine shaft being carried on purpose designed pilaster or similar foundations (64).

At the lower level of the system, the ore loading chamber (9) could be constructed by different construction systems depending on the particular pressure requirements. For example, the chamber may incorporate a loading chamber head plate (65) into which the common housing (21) of the control device (11) would be connected. This head plate may also incorporate the ore ingress valve (66) fed under gravity from a collection hopper (10), such ingress valve constituting a closure for the chamber (9) and being optionally located in the horizontal plane within the metal thickness of the pressure cap at position (67).

As a means to fix and stabilise the ore loading chamber at its capped upper level, three positioning jacks (68) can be set into the edge of the capping or otherwise located where the ore ingress valve could also have a rock reactant sealed valve (69), this being the most vulnerable pressure point in the entire cyclic system.

The means by which the volume of the ore loading chamber can be extended uses one or more sections of thick walled cylinder (70) with top and base grooves (71) to incorporate deformable ring seals (72), which would locate into corresponding grooves in the underside of the upper capping plate (73) and the top of base block (74). This may have a coned internal shape passing into an incorporated U bend (75) where this and the upper capping plate would have a sufficiency of pre stressable bolts (76) able to withstand the salient pressure with the said deformable seals in operational state. The loading chamber may thus be of monolithic construction; it would be able to have the upwardly-extending duct connecting to U tube bend (77) attached to the cylinder sections by clamps (78), where the upper end of said duct would connect into the common control valve housing with whatever vacuum or pressure bleed off valve (79) being set into an adjustable coupling (80) able to complete the sealed in fluid circuitry.

The motivating force of the total cyclic system is derived from the pressure imbalance 15 between fluid in the longer and shorter U tubes as follows. The cycle begins with the reservoir 57 filled with flotation fluid produced by mixing in mixer 13 a suitable flotation material (preferably a pseudoplastic) and water derived from the water supply 12, as shown in FIGS. 1 and 2. The flotation fluid 15 (FIGS. 1, 2) is pumped into the reservoir 57 under the action of pump 14 and valves 16 (FIG. 2). Fluid in column 3 from the reservoir 57 exerts a hydraulic jacking force by which the ore placed in the loading chamber 9 from one of the tunnels 7 is forced into a U tube bend 75 at its lowest level by the superimposed hydrostatic head of flotation fluid from the upper U tube 3. The ore plus flotation fluid is thereby forced up the U tube 4 through the sliding valve 11, which is in a position such that the lower portion 75 of the U tube 4 communicates fluidically with the upper portion 4. In this manner, a batch of ore is delivered to the vibrating screen 18 and hydrocyclone 17 where the flotation fluid can be recovered for recycling back into the reservoir 57 by means of the valves 16 and the extracted ore 19 can be delivered to the main ore treatment plant 20.

The upper tube 3 is shut off from the lower part 75 of U tube 4 by movement of the sliding piston 35 of multi-valve control apparatus 11, shown in FIG. 3, after each batch of ore has passed through it. As previously described, movement of the piston 35 is achieved by the operation of hydraulic jack(s) 38, 40, assisted by gravity weighted element 26 coupled to it by chain and sprocket assembly 32, 33 (FIG. 3).

After each such cyclic action, the loading chamber 9 holds flotation fluid equal to the displaced volume of ore. A similar amount of fresh ore is then placed dry into the loading chamber 9. The ore displaces its own volume of fluid via valve passageway 46, interconnecting conduits 75, 77, through gravity overflow, as previously described with reference to FIG. 3, to the lower holding sump (FIGS. 1, 2). From there, pump 6 at the lowest level of the cyclic system then transfers the excess flotation fluid through valve 47 (as shown in FIG. 2) up to the holding reservoir 57 at the head of the longer U tube limb which has a sufficient cubic capacity and height above the discharge end of the shorter U tube limb to promote a gravity flow under the action of the imbalance between the two limbs. The whole cyclic system is thus powered by only the sump pump 6, which can be of sufficient size to drive any upper fluid circulation elements relating to the mixing and recycling of flotation fluid.

The cyclic hydraulic ore hoist system as controlled by the apparatus according to the invention, whilst especially suitable for use with a hydrophilic biopolysaccharide pseudoplastic chemical of the Xanthomanas campestris plant pathogen family, can be used with chemical systems having lesser suspending and transportation capability as include both water behaving to newtonian fluid law and bentonite clay suspensions which exhibit the hysteresis loop condition due to inclusion of solid particles having a propensity to clog in small confined spaces within mechanical moving parts or to degrease lubricating oil from inundated hydraulic rams. It is a purpose of the system controlled by the multi valve apparatus to provide a biodegrable chemical fluid element allowing its global use in mine and civil tunnel works where on completion of such use it can, by simple water addition, be returned to a state immediately useable within any mine or civil engineering work, such as drilling or concreting, but as importantly for onward agricultural use.

While the invention is susceptible to various equivalent and alternative forms, the specific embodiment thereof are shown by way of example and is intended to cover all equivalents and alternatives falling within the spirit and scope of the invention as defined in the appended claims.

I claim:

1. Apparatus adapted for transporting particulate materials in batches from a lower level to a higher level, comprising:
    a flow loop comprising a closeable chamber for receiving batches of the particulate materials, a first flow conduit extending upwardly from the chamber to a delivery level, a second flow conduit extending upwardly from the chamber to a header tank located at a higher level than said delivery level, and valve means at the chamber for selectively isolating the chamber from the first and second flow conduits;
    means for filling the header tank and the flow loop with a pseudoplastic flotation fluid;
    means for introducing a batch of the particulate materials into the chamber and means for closing the chamber; and
    means for separating the particulate material from the fluid discharged at the delivery level and means for returning the fluid to the header tank.

2. Apparatus according to claim 1, wherein the means for separating the particulate material comprise a screen.

3. Apparatus according to claim 1, wherein the means for returning the fluid to the header tank comprises a pump.

4. Apparatus according to claim 1, comprising a valve at the delivery level to control the flow of fluid from the header tank into the second fluid conduit.

5. Apparatus according to claim 1, wherein the valve means at the chamber is operable to select one of:
    a first state, in which the chamber is connected to the first and second flow conduits;
    a second state, in which the chamber is isolated from the first and second flow conduits and the first and second flow conduits are isolated one from the other; and
    a third state, in which the chamber is isolated from the first and second flow conduits and the first and second flow conduits are in flow communication with each other.

6. Apparatus according to claim 5, wherein the valve means at the chamber comprises:
    a sliding valve member for selectively: (i) opening communication between the chamber and the first flow conduit; (ii) opening communication between the first flow conduit and the second flow conduit; and (iii) closing off the first flow conduit from the chamber and from the second flow conduit; and
    a plug valve member movable vertically between two plug valve seats to open and close communication between the chamber and the second flow conduit, the plug valve member being linked to the sliding valve member so as to move in response to movement thereof, thereby synchronising closing of communication between the chamber and the second flow conduit with selection of conditions (i) and (iii) of the sliding valve member.

7. Apparatus according to claim 6, wherein the plug valve member is linked to the sliding valve member by a flexible link member.

8. Apparatus according to claim 7, wherein the flexible link member is a chain.

9. Apparatus according to claim 7, wherein the sliding valve member is movable substantially horizontally and the flexible link member passes over a sprocket.

10. Apparatus according to claim 6, wherein hydraulic piston means are coupled to the sliding valve member to cause said member to slide.

11. Apparatus according to claim 10, wherein the hydraulic piston means is operated with the flotation fluid as hydraulic fluid.

* * * * *